United States Patent
Chabinsky et al.

(10) Patent No.: US 8,886,038 B1
(45) Date of Patent: Nov. 11, 2014

(54) WEIGHTED WAVEFORMS FOR IMPROVED JAM CODE EFFECTIVENESS

(75) Inventors: Jordan Chabinsky, Nashua, NH (US); Jeffrey Jew, Brookline, NH (US); Philip Soletsky, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 138 days.

(21) Appl. No.: 13/460,130

(22) Filed: Apr. 30, 2012
(Under 37 CFR 1.47)

Related U.S. Application Data

(60) Provisional application No. 61/480,881, filed on Apr. 29, 2011.

(51) Int. Cl.
*H04K 3/00* (2006.01)
*G01S 7/36* (2006.01)

(52) U.S. Cl.
USPC .................................. 398/39; 342/13; 342/14

(58) Field of Classification Search
CPC ..................................... H04K 3/00; G01J 1/00
USPC ........................................................... 398/39
See application file for complete search history.

(56) References Cited

U.S. PATENT DOCUMENTS

| | | | |
|---|---|---|---|
| 6,359,710 B1 * | 3/2002 | Takken et al. | 398/178 |
| 6,429,446 B1 * | 8/2002 | Labaugh | 250/504 R |
| 6,825,792 B1 * | 11/2004 | Letovsky | 342/14 |
| 6,933,877 B1 * | 8/2005 | Halladay et al. | 342/14 |
| 7,068,209 B2 * | 6/2006 | Gounalis | 342/13 |
| 7,212,148 B1 * | 5/2007 | Torres | 342/13 |
| 7,379,626 B2 * | 5/2008 | Lachine et al. | 382/300 |
| 7,425,916 B2 * | 9/2008 | Stevens, Jr. | 342/13 |
| 7,504,982 B2 * | 3/2009 | Berg et al. | 342/13 |
| 7,684,751 B2 * | 3/2010 | Posamentier | 455/1 |
| 7,826,839 B1 * | 11/2010 | Nicholas | 455/431 |
| 7,916,065 B1 * | 3/2011 | Mintz et al. | 342/13 |
| 7,925,159 B2 * | 4/2011 | Dove | 398/39 |
| 7,982,654 B2 * | 7/2011 | Low | 342/15 |
| 8,049,656 B2 * | 11/2011 | Shani et al. | 342/14 |
| 8,063,346 B2 * | 11/2011 | Lytle et al. | 244/3.1 |
| 8,258,994 B2 * | 9/2012 | Hamilton | 342/14 |
| 8,368,580 B2 * | 2/2013 | Manela et al. | 342/13 |
| 8,378,277 B2 * | 2/2013 | Sandomirsky et al. | 244/3.16 |
| 8,464,949 B2 * | 6/2013 | Namey et al. | 235/411 |
| 8,493,261 B2 * | 7/2013 | Bradley | 342/14 |
| 8,543,053 B1 * | 9/2013 | Melamed et al. | 455/1 |
| 2008/0018519 A1 * | 1/2008 | Berg et al. | 342/14 |
| 2008/0111728 A1 | 5/2008 | Stevens | |
| 2008/0174469 A1 | 7/2008 | Stark et al. | |
| 2009/0015458 A1 * | 1/2009 | Hamilton | 342/14 |
| 2009/0214205 A1 * | 8/2009 | Clark et al. | 398/39 |
| 2009/0237289 A1 * | 9/2009 | Stoddard | 342/14 |
| 2009/0322584 A1 * | 12/2009 | Herman | 342/13 |
| 2010/0126335 A1 * | 5/2010 | Saban et al. | 89/36.01 |
| 2011/0187576 A1 * | 8/2011 | Salewski | 342/14 |
| 2012/0119933 A1 * | 5/2012 | Manela et al. | 342/14 |
| 2013/0178148 A1 * | 7/2013 | Delaveau et al. | 455/1 |

OTHER PUBLICATIONS

U.S. Office Action dated Jun. 2, 2014 received in related U.S. Appl. No. 13/460,119.

* cited by examiner

*Primary Examiner* — Ken Vanderpuye
*Assistant Examiner* — Amritbir Sandhu
(74) *Attorney, Agent, or Firm* — Scully, Scott, Murphy & Presser, P.C.

(57) ABSTRACT

Various embodiments of the present invention relate to weighted waveforms for improved jam code effectiveness. In various examples, weighted waveforms for improved jam code effectiveness may be implemented in the context of systems, methods, computer program products and/or algorithms.

36 Claims, 10 Drawing Sheets

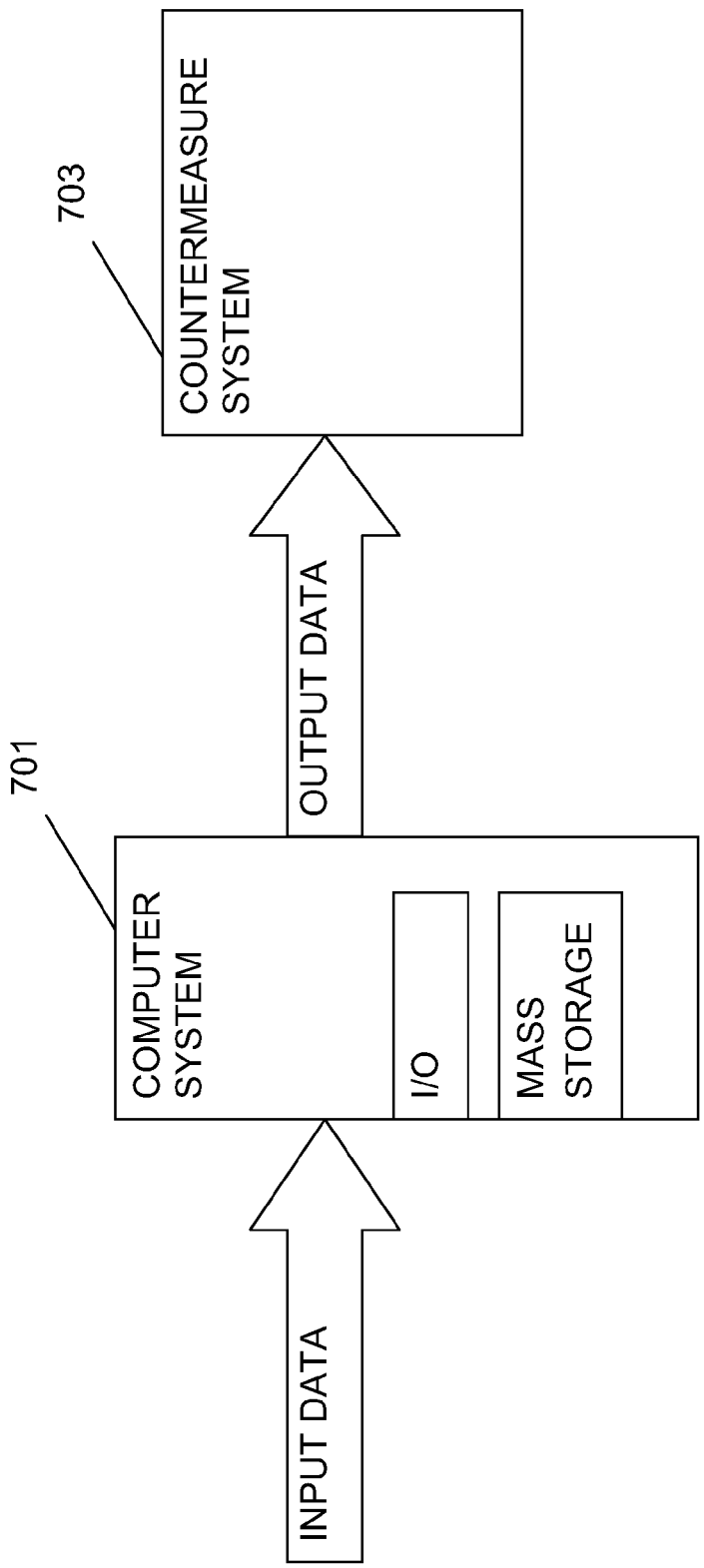

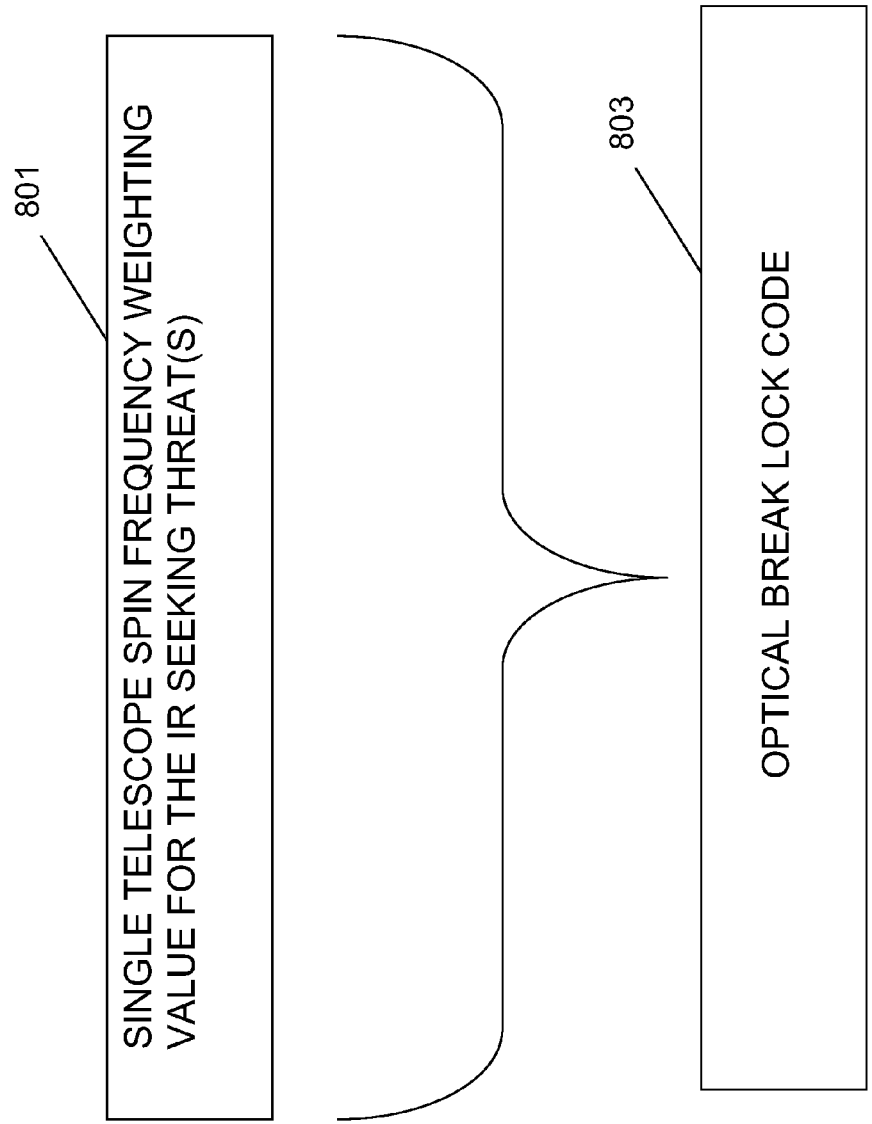

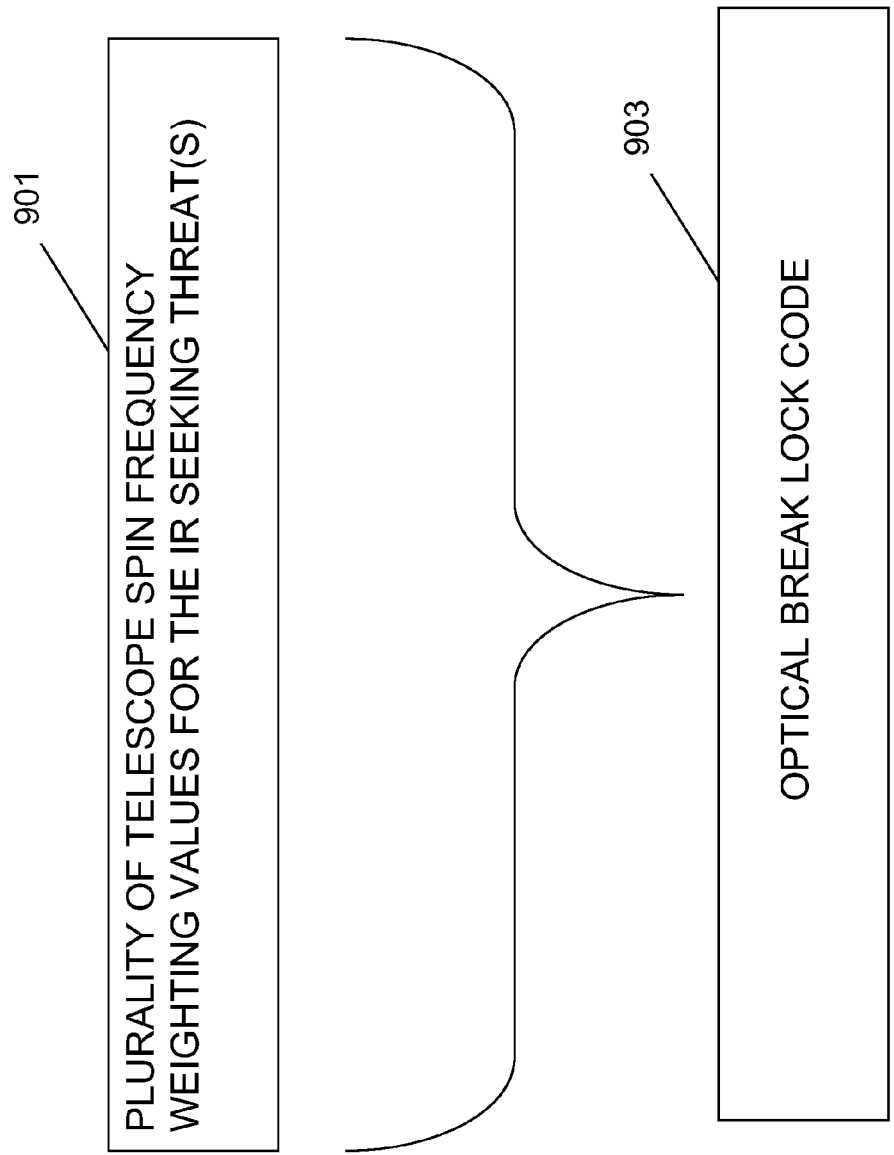

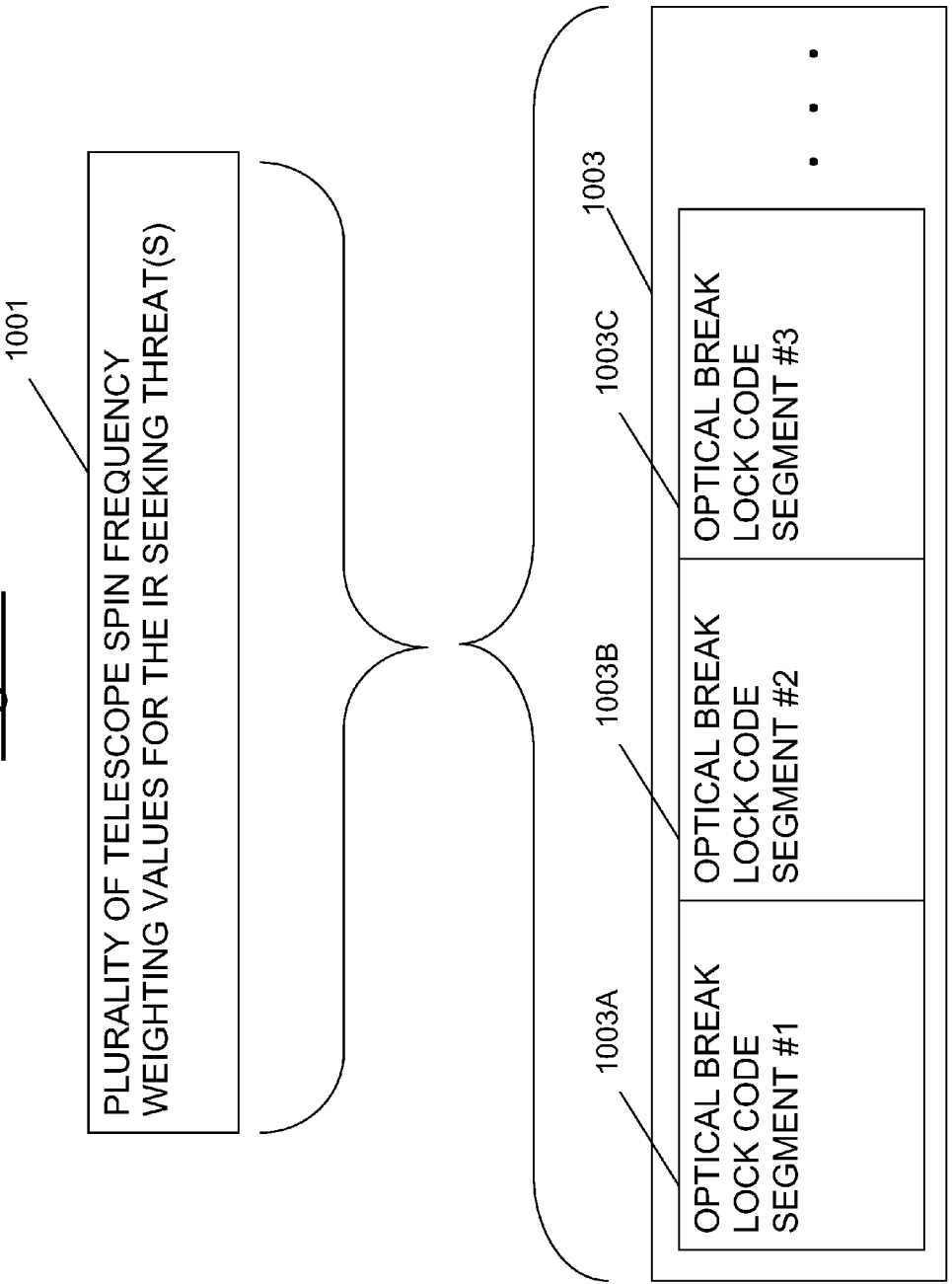

WEIGHTED WAVEFORMS FOR IMPROVED JAM CODE EFFECTIVENESS

CROSS-REFERENCE TO RELATED APPLICATIONS

This application claims the benefit under 35 U.S.C. §119(e) of U.S. Provisional Application Ser. No. 61/480,881, filed Apr. 29, 2011. The entire contents and disclosure of the aforementioned provisional application is incorporated by reference as if fully set forth herein.

BACKGROUND OF THE INVENTION

1. Field of the Invention

Various embodiments of the present invention relate to weighted waveforms for improved jam code effectiveness.

In various examples, weighted waveforms for improved jam code effectiveness may be implemented in the context of systems, methods, computer program products and/or algorithms.

2. Description of Related Art

Infrared (IR) guided surface-to-air missiles typically work by detecting emitted IR radiation from a target. IR energy is collected by a spinning gyroscopic telescope and is modulated by a complex reticle. This modulated energy is collected by an IR sensitive detector and is used to generate a time-varying electrical signal. This signal has features (e.g., amplitude and/or frequency) which are proportional to the pointing error angle between the gyroscopic telescope and the target in question.

The detected signal is typically processed through two electrical control loops. The first loop is commonly referred to as the "track" loop and is used to maintain the pointing of the gyroscopic telescope. The track loop acts to reduce the measured error angle between the gyroscopic telescope and the target. The second loop is commonly referred to as the "guidance" loop and is used to maintain the pointing of the missile body. The guidance loop acts to steer the missile body to a predicted intercept point based on the perceived target motion.

In the employment of directable IR laser countermeasures, a laser is aimed into the missile's gyroscopic telescope and the laser light is modulated in such a way as to emulate the error signal of the missile. Using a higher laser power and stray-light paths, the laser light is able to generate a more powerful signal than the true error signal associated with the target. This countermeasure signal is used to steer the missile's gyroscopic telescope to a position where the gyroscopic telescope can no longer see the target. A missile which has been commanded to look at a position other than the target is said to be in a condition of optical break lock ("OBL"). OBL is typically the primary defeat mechanism for modern laser jammers and frequencies.

Frequencies in modern OBL jam codes are typically selected based on the "spin" frequency of the missile's gyroscopic telescope. That is, the frequencies used in the jam codes are selected to match the best guess of the current spin rate of the missile's gyroscopic telescope. This produces straight line motion from the missile head and generates the fastest OBL possible. A significant complexity to this scenario is the variance in gyroscopic telescope spin frequency within each specific missile type. A particular class of missiles can have spin frequency variation within a band of operation due to manufacturing error tolerances; a missile can also have a variance of an ever greater degree specifically by the design of the missile itself. The latter is a scenario presenting a greater challenge, as this variance will typically cover a far greater frequency band, and will typically be a function of the missile flight profile.

Of note, at any given time, the correct frequency with which to jam a missile is the frequency at which the missile telescope is currently spinning. Given the ambiguity in missiles with variable frequencies, conventional code typically covers at least the entire design range of the missile spin rates; however, only a small portion of such conventional code is typically truly effective (from a conventional design point of view a difficulty has arisen because it has not been known which part of code is the effective part for an arbitrary engagement).

FIG. 1 shows a block diagram of a conventional interaction between an IR seeking missile and a countermeasure system installed on a target. As seen in this figure, missile 101 includes seeker head 101A (having therein a spinning gyroscopic telescope). The seeker head 101A detects emitted IR radiation from a target 103 (e.g., an aircraft or the like). Further, countermeasure system 105 includes laser 105A, which sends laser light (not necessarily visible) to the missile's gyroscopic telescope.

FIG. 2 shows a block diagram of a conventional effect on a missile's gyroscopic telescope spin frequency as a result of the missile's spin (which may change, for example, at different times in the missile's flight profile). As seen in this figure (which is taken from the perspective of looking head-on into missile 201) if, for example, the missile's gyroscopic telescope 203 is rotating clockwise at a spin frequency of X, and the missile 201 itself is rotating counterclockwise at a spin frequency of Y, the effective spin frequency of the gyroscopic telescope 203 is X-Y. Of course, rotation in the same direction would be additive.

SUMMARY OF THE INVENTION

In various examples, weighted waveforms for improved jam code effectiveness may be implemented in the context of systems, methods, computer program products and/or algorithms.

In one embodiment, a computer readable storage medium, tangibly embodying a program of instructions executable by the computer for generating at least one optical break lock code segment for jamming at least one IR radiation seeking threat is provided, the program of instructions, when executing, performing the following steps: generating a set of telescope spin frequency weighting values for the IR seeking threat based at least in part on telescope spin frequency variation data for the IR seeking threat and jam power data for the IR seeking threat; and generating an optical break lock code segment for the IR seeking threat based at least in part on the set of telescope spin frequency weighting values.

In another embodiment, a method implemented in a computer system for generating at least one optical break lock code segment for jamming at least one IR radiation seeking threat is provided, the method comprising the steps of: generating with the computer system a set of telescope spin frequency weighting values for the IR seeking threat based at least in part on telescope spin frequency variation data for the IR seeking threat and jam power data IR for the seeking threat; and generating with the computer system an optical break lock code segment for the IR seeking threat based at least in part on the set of telescope spin frequency weighting values.

In another embodiment, a method implemented in a computer system for generating at least one optical break lock code segment for jamming at least one IR radiation seeking threat is provided, the method comprising the steps of: receiving with the computer system telescope spin frequency variation data for the IR seeking threat; receiving with the computer system jam power data for the IR seeking threat; receiving with the computer system timeline data for the IR seeking threat; generating with the computer system a set of telescope spin frequency weighting values for the IR seeking threat based at least in part on the received telescope spin frequency variation data for the IR seeking threat and the received jam power data for the IR seeking threat; generating with the computer system an optical break lock code segment for the IR seeking threat based at least in part on the set of telescope spin frequency weighting values; and configuring, with the computer system, a countermeasure system to use the optical break lock code segment for jamming the IR radiation seeking threat.

In another embodiment, a method implemented in a computer system for generating at least one optical break lock code segment for jamming at least one IR radiation seeking threat is provided, the method comprising the steps of: generating with the computer system telescope spin frequency variation data for the IR seeking threat; generating with the computer system jam power data for the IR seeking threat; generating with the computer system timeline data for the IR seeking threat; generating with the computer system a set of telescope spin frequency weighting values for the IR seeking threat based at least in part on the received telescope spin frequency variation data for the IR seeking threat and the received jam power data for the IR seeking threat; generating with the computer system an optical break lock code segment for the IR seeking threat based at least in part on the set of telescope spin frequency weighting values; and configuring, with the computer system, a countermeasure system to use the optical break lock code segment for jamming the IR radiation seeking threat.

BRIEF DESCRIPTION OF THE DRAWINGS

The drawings are provided for illustrative purpose only and do not necessarily represent practical examples of the present invention to scale. In the figures, the same reference signs are used to denote the same or like parts.

FIG. 7 is a block diagram of a system according to another embodiment of the present invention;

FIG. 8 is a block diagram of a spin frequency weighting value and optical break lock code according to one embodiment of the present invention;

FIG. 9 is a block diagram of a plurality of spin frequency weighting values and optical break lock code according to another embodiment of the present invention; and FIG. 10 is a block diagram of a plurality of spin frequency weighting values and optical break lock code (having a plurality of optical break lock code segments) according to another embodiment of the present invention.

DETAILED DESCRIPTION OF THE INVENTION

Figure 1:
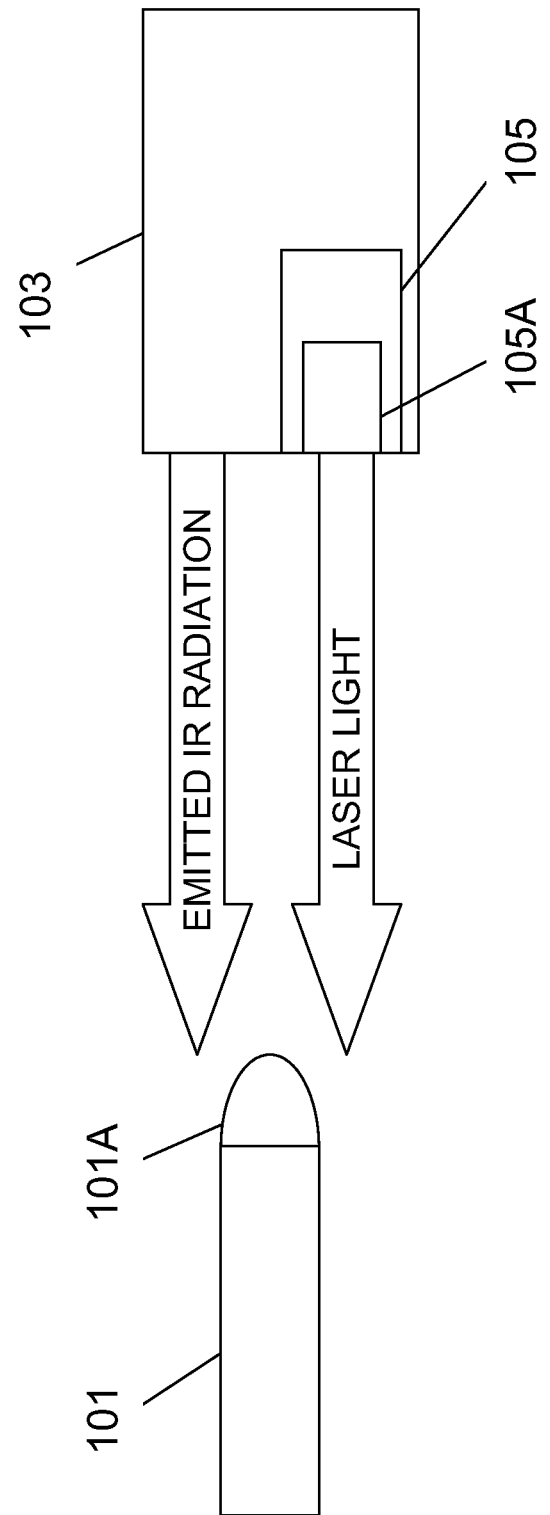
FIG. 1 is a block diagram of a conventional interaction between an IR seeking missile and a countermeasure system installed on a target.
Figure 2:
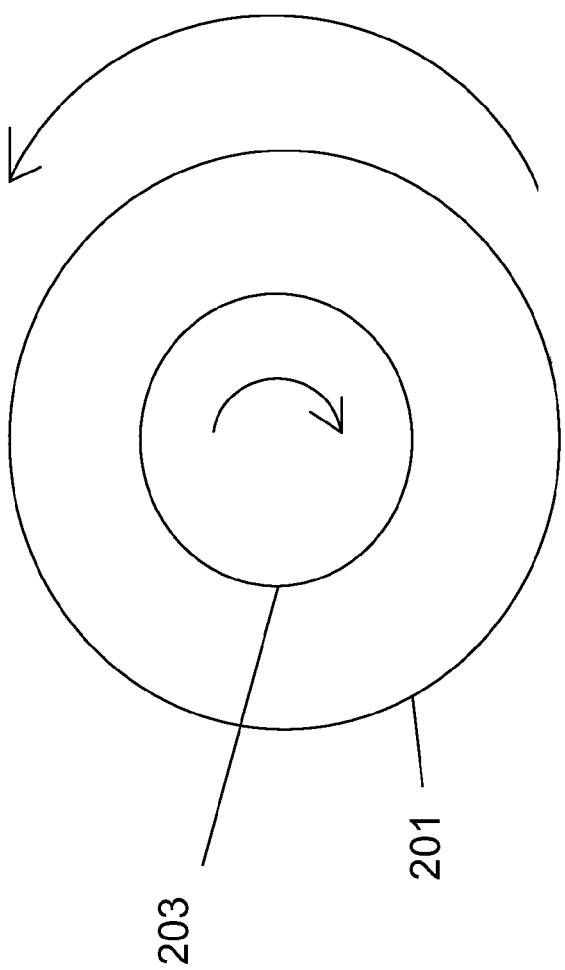
FIG. 2 is a block diagram of a conventional effect on a missile's gyroscopic telescope spin frequency as a result of the missile's spin.

For the purposes of describing and claiming the present invention the term "computer readable storage medium" is intended to refer to a tangible device for storing thereon computer program instructions (or computer programs). Examples include (but are not limited to): magnetic hard drives, optical hard drives, solid state memory devices. The computer program instructions (or computer programs) may be stored on the computer readable storage medium in a non-transitory fashion.

For the purposes of describing and claiming the present invention the term "flight profile" is intended to refer to the kinematic (rotational velocity, linear velocity, mass, etc.) and electrical (filter bandwidth, gain, etc.) properties of the threat missile which may evolve over the duration of the engagement. For instance, the telescope spin frequency of some missiles varies over the duration of the flight. Some missiles may alter their electrical gains at different portions of the flight, changing their susceptibility to jamming effects.

For the purposes of describing and claiming the present invention the term "telescope spin frequency weighting values" is intended to refer to an a priori estimate of the required spectral jam power to defeat a missile of a given type with the assumption that it is spinning at a given frequency. A hypothetical missile of a given type may require differing jam spectral power at X Hz and Y Hz. Typically determine via laboratory testing.

For the purposes of describing and claiming the present invention the term "telescope spin frequency variation data" is intended to refer to the probability distribution of all possible frequencies at which a given threat telescope may be spinning. For a hypothetical missile, this may comprise a uniform distribution between X Hz and Y Hz, or any other weighted distribution. This distribution may be determined a priori through laboratory testing and/or may be measured during the engagement through remote sensing techniques.

For the purposes of describing and claiming the present invention the term "jam power data" is intended to refer to an estimate of the required optical power to jam a particular threat given the platform signature (dependent on threat, platform, and engagement angle). For instance, hypothetical threat A may require a jammer-to-signature ratio (J:S) of X:1 while hypothetical threat B requires only Y:1, where Y is less than X.

For the purposes of describing and claiming the present invention the term "timeline data" is intended to refer to an estimate of both the time remaining in a threat engagement and the time since the threat launch. Based on both a priori analysis of missile characteristics (motor thrust, missile mass, missile aerodynamic coefficients) and ongoing observations of the threat engagement (threat kinematics, missile motor intensity).

Each IR seeking threat contains within its sensor a filter which is spectrally "matched" in frequency to the spin frequency that will be generated by the missile's gyroscopic telescope while the missile is in flight. The spectral response of such a filter is typically not flat across the band and will therefore be either more or less responsive at the different gyroscopic telescope spin frequencies. The result is that a given missile will require different amounts (or "weights") of laser power to generate OBL at different gyroscopic telescope spin frequencies. Additionally, the missile flight profile will cause an effective gyroscopic telescope spin frequency variation in a way that can be assigned statistics. These statistics allow for a second dimension of "weighted" values to be assigned to each frequency within the band, thus prioritizing the frequencies.

Due to the large variance in frequency space covered by the threat, increased resources are typically required to defeat each threat, either in the form of laser energy, time or both. However, during a typically short engagement, time is not in abundance and there is an ever present desire to reduce the amount of energy required to achieve OBL within these types of scenarios. To accommodate these needs, exploitation of the threat's detector spectral response is leveraged by various embodiments of the present invention.

Modulating laser energy at frequencies in a prioritized way based on the response curve of the missile's IR seeker (and/or the effective gyroscopic telescope spin frequency variation associated with missile flight profile) will allow for efficient use of the available resources—those resources being laser energy and time. A jam code segment for a given threat may be generated by allocating laser energy and time across the missile's IR seeker frequency band (with the priorities based upon the missile's IR seeker filter spectral response and/or effective gyroscopic telescope spin frequency variation associated with the missile flight profile) until all required frequencies are covered. Additionally, frequencies which are statistically "less likely" to occur, and/or are "likely" to occur at a certain time, and/or are "likely" to occur for shorter periods of time, and/or are "likely" to occur for longer periods of time may be used in the prioritization in order to augment the weighting scheme and refine the jam code that is generated.

As described herein in connection with various embodiments, the selection of an appropriate frequency "weighted" allocation provides a jam code that achieves an OBL for a given threat with a minimum amount of laser energy within the shortest period of time.

Testing had provided insight leading to the postulation that jam code efficiency could be increased by tailoring a particular jam code segment to consider the variability in frequency spectral response across the band of the threat being targeted. In addition to reducing the jammer signal intensity level to target signal intensity level (J/S) needed to achieve OBL using this technique, time allocation per jam code segment can be minimized as well, thereby allowing more time availability for additional threat coverage.

In one example, selection of threat missile type(s) is a priori based on a list of potential threat(s). In another example, threat frequency variation is also a priori knowledge based on missile testing and threat report(s). In yet another example, threat jam power and timeline requirements are a priori knowledge as well. From these givens, a jam code consisting of multiple individual segments may be constructed (e.g., prior to flight of the countermeasure system) to address the collection of expected threat(s). Generically, each individual segment may be, for example, the binary product of a "spin" frequency waveform and a "carrier" frequency waveform. Weighting of the individual segments may be performed, for example, by varying segment length and/or frequencies to address certain threat(s) or threat case(s) for more or less time.

Additionally, weighting within a jam code and/or individual segments of a jam code may be something that is dependent on a missile's filter response curve, as well as what the likelihood is of finding a particular threat "spinning" at a given frequency within the available frequencies of which it could be spinning. This last portion is part of the flight profile mentioned above. For example, threats which are very late along within their engagement are not necessarily as common and this carries with it an implication to the "spin" at which the missile's gyroscopic telescope is operating.

In another example, an optical break lock code segment may be generated based at least in part on a set of telescope spin frequency weighting values as follows: For a missile A which has telescope frequency variation data indicating uniformly probable spin frequencies between X Hz and Y Hz (X being lower than Y), but significantly lower jam power requirements (i.e. telescope spin frequency weighting values) between X Hz and Z Hz (Z being between X and Y), a jam code may be generated with two segments, a segment M msec in length with frequencies between X Hz and Z Hz and a second segment N msec (N being greater than M) in length with frequencies between Z Hz and Y Hz. The additional time spent in the second segment in general results in more power in that spectral band.

As will be appreciated by one skilled in the art, aspects of the present invention may be embodied as one or more systems, methods, computer program products and/or algorithms.

Figure 3:
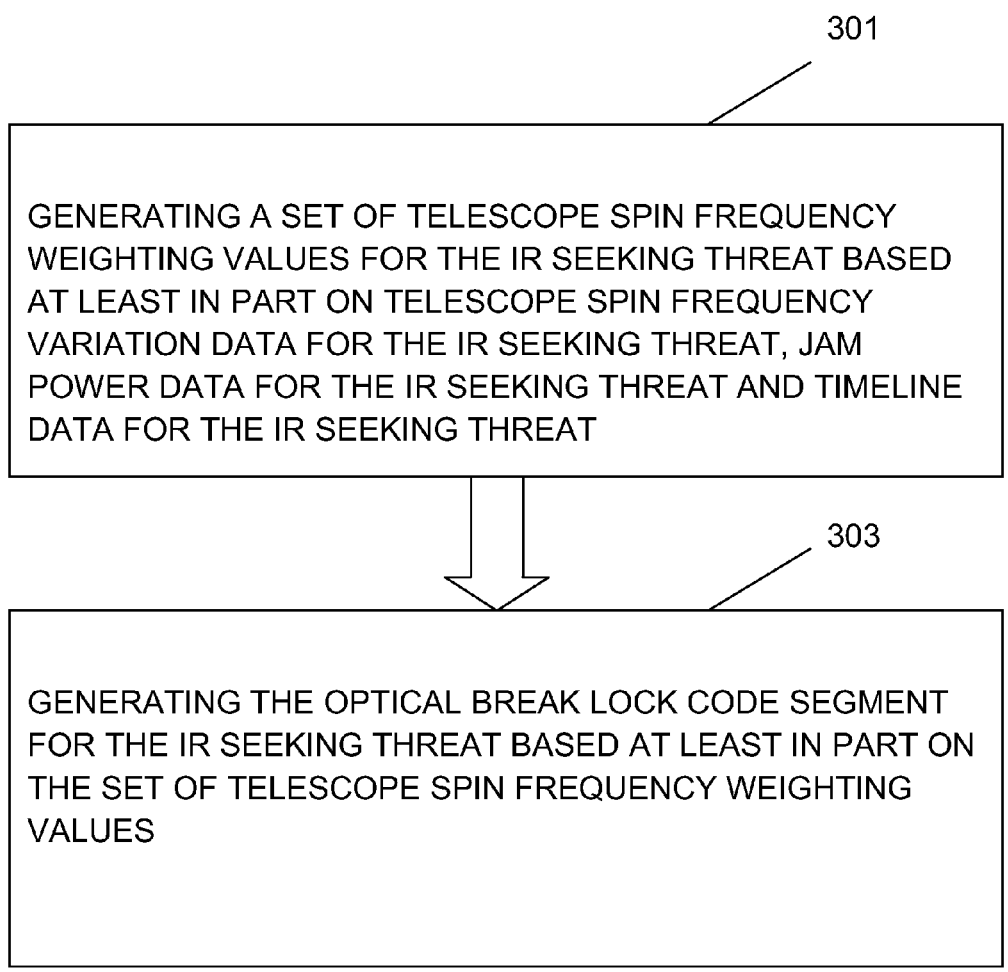
FIG. 3 is a flowchart of a method according to one embodiment of the present invention.

Referring now to FIG. 3, a flowchart of a method according to one embodiment of the present invention is shown. As seen in this figure, Step 301 comprises generating a set of spin frequency weighting values for the IR seeking threat based at least in part on spin frequency variation data for the IR seeking threat, jam power data for the IR seeking threat and timeline data for the IR seeking threat. In one example, this generating may be carried out by a computer system.

Further, Step 303 comprises generating the optical break lock code segment for the IR seeking threat based at least in part on the set of spin frequency weighting values. In one example, this generating may be carried out by a computer system.

Figure 4:
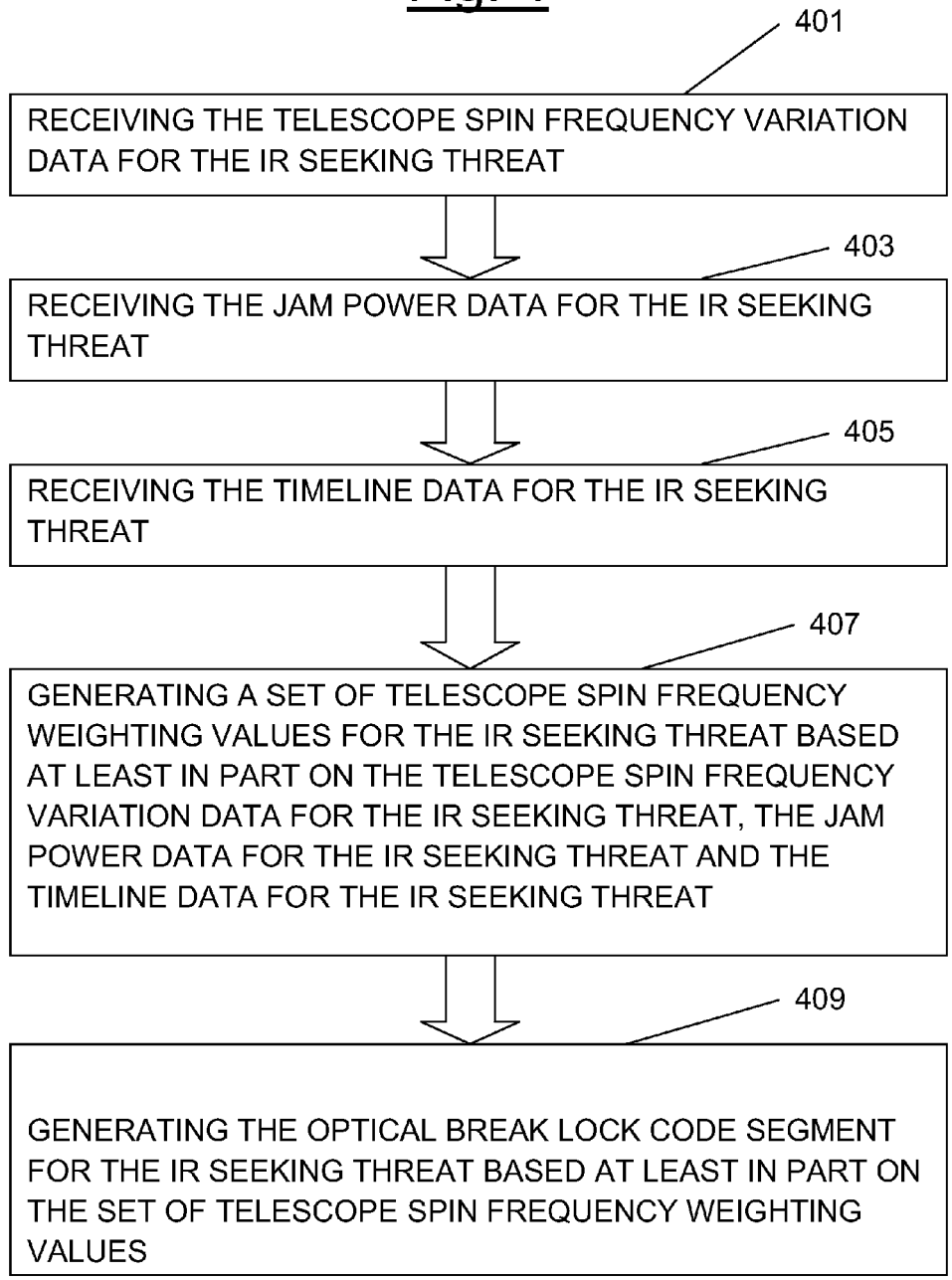
FIG. 4 is a flowchart of a method according to another of the present invention.

Referring now to FIG. 4, a flowchart of a method according to another embodiment of the present invention is shown. The embodiment of this FIG. 4 is similar to FIG. 3, but adds a number of receiving steps. More particularly, as seen in this FIG. 4, Steps 401, 403 and 405 comprise receiving the spin frequency variation data for the IR seeking threat; receiving the jam power data for the IR seeking threat; and receiving the timeline data for the IR seeking threat. In one example, this receiving may be carried out by a computer system.

Further, Step 407 comprises generating a set of spin frequency weighting values for the IR seeking threat based at least in part on the spin frequency variation data for the IR seeking threat, the jam power data IR for the seeking threat and the timeline data for the IR seeking threat. In one example, this generating may be carried out by a computer system.

Further still, Step 409 comprises generating the optical break lock code segment for the IR seeking threat based at least in part on the set of spin frequency weighting values. In one example, this generating may be carried out by a computer system.

Figure 5:
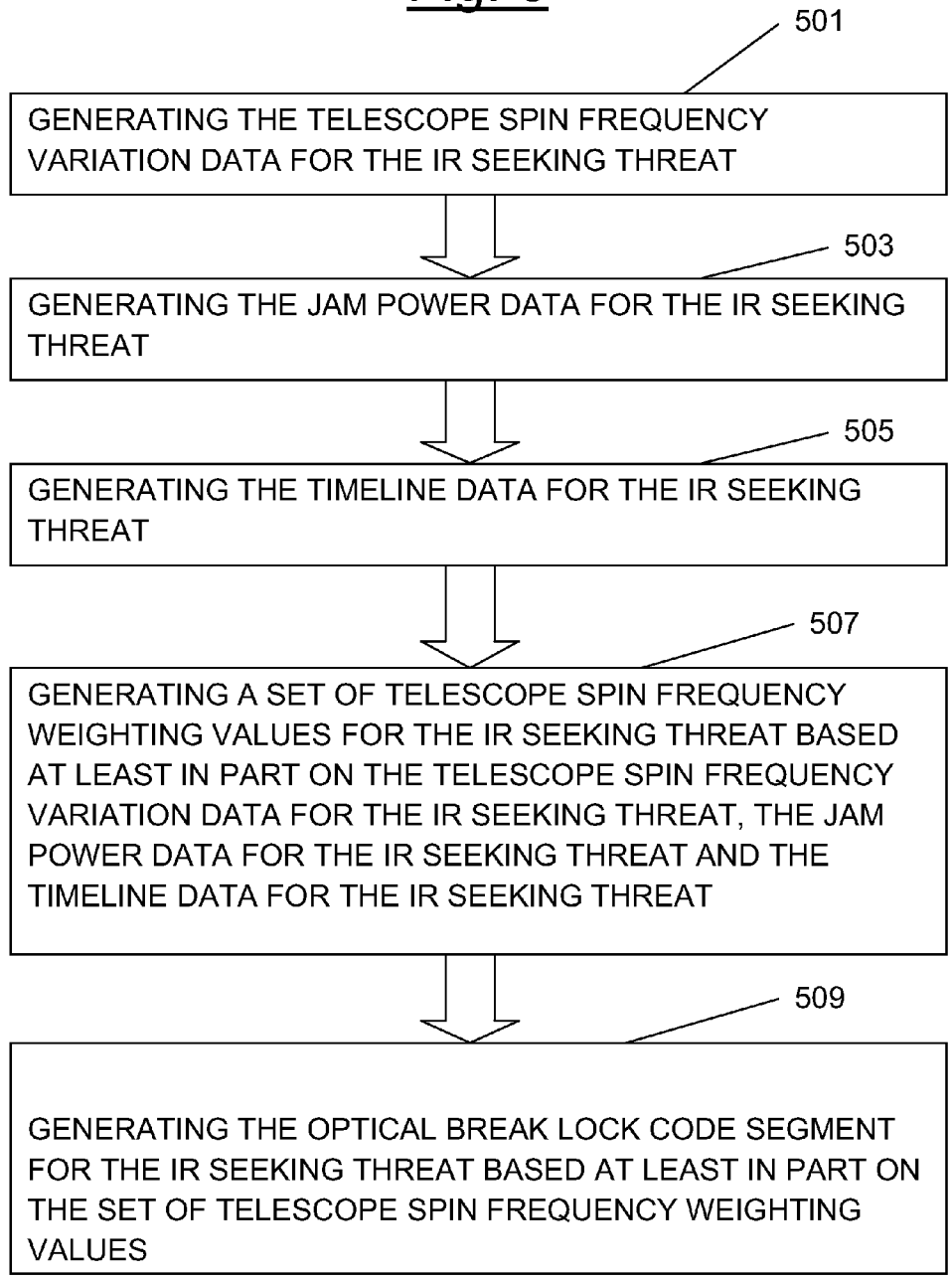
FIG. 5 is a flowchart of a method according to another embodiment of the present invention.

Referring now to FIG. 5, a flowchart of a method according to another embodiment of the present invention is shown. The embodiment of FIG. 5 is similar to FIG. 3, but adds a number of generating steps. More particularly, as seen in this FIG. 5, Steps 501, 503 and 505 comprise generating the spin frequency variation data for the IR seeking threat; generating the jam power data for the IR seeking threat; and generating the timeline data for the IR seeking threat. In one example, this generating may be carried out by a computer system.

Further, Step 507 comprises generating a set of spin frequency weighting values for the IR seeking threat based at least in part on the spin frequency variation data for the IR seeking threat, the jam power data for the IR seeking threat and the timeline data for the IR seeking threat. In one example, this generating may be carried out by a computer system.

Further still, Step 509 comprises generating the optical break lock code segment for the IR seeking threat based at least in part on the set of spin frequency weighting values. In one example, this generating may be carried out by a computer system.

Figure 6:
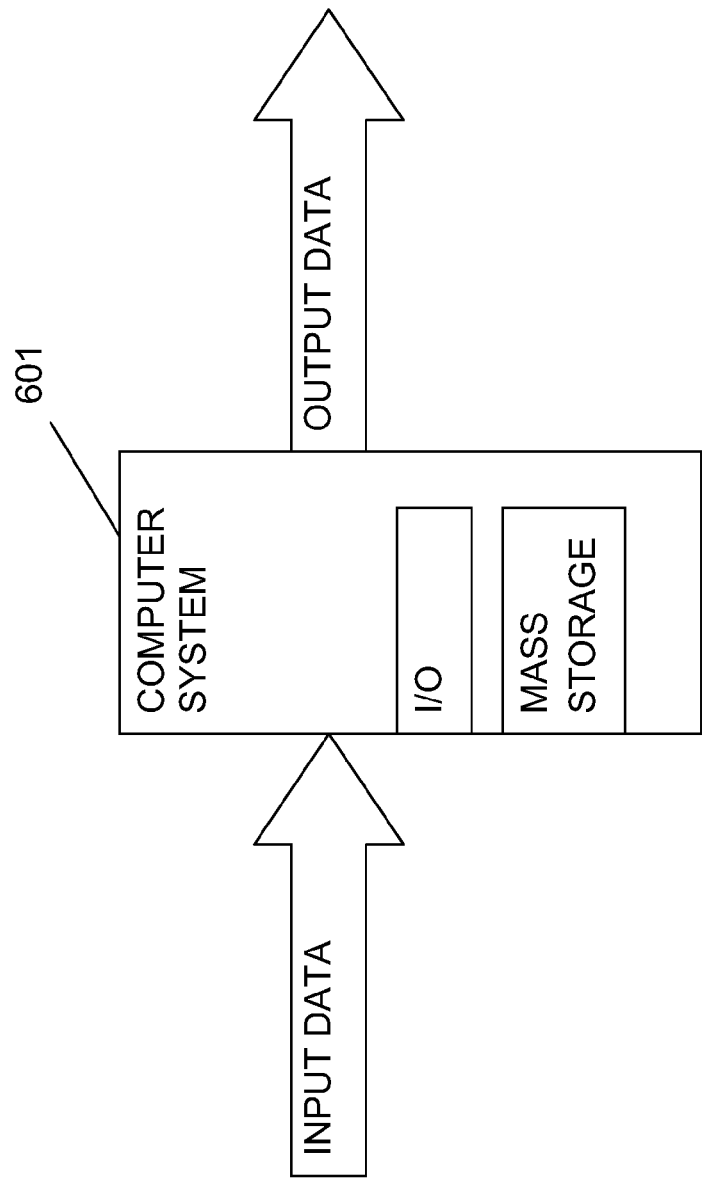
FIG. 6 is a block diagram of a system according to one embodiment of the present invention.

Referring now to FIG. 6, a block diagram of a system according to one embodiment of the present invention is shown. As seen in this figure, computer system 601 includes an I/O subsystem. The I/O subsystem handles data input, data output and network communication. These may be implemented, for example, via keyboard, mouse, video monitor, scanner, optical character recognition, magnetic storage medium, optical storage medium, LAN, WAN and/or the Internet. Computer system 601 also includes a Mass Storage subsystem. The Mass Storage subsystem (which may comprise a computer readable storage medium as defined herein) handles storage of data and/or software programs. The Mass Storage subsystem may be implemented, for example, using one or more magnetic hard drives, one or more optical hard drives and/or one or more solid state memory devices.

In another embodiment, a countermeasure system is provided, comprising: a laser; a storage unit; and a processor in operative communication with the laser and the storage unit; wherein the storage unit includes: (a) at least one optical break lock code segment; and (b) program instructions for operating the laser based at least in part on the optical break lock code segment. In one example, the optical break lock code segment included in the storage unit is based at least in part on a set of telescope spin frequency weighting values for an IR seeking threat. In another example, the telescope spin frequency weighting values are based at least in part on telescope spin frequency variation data for an IR seeking threat, jam power data for an IR seeking threat and timeline data for an IR seeking threat.

Still referring to FIG. 6, it is seen that computer 601 receives input data and provides output data. In one example, the input data may comprise spin frequency variation data for one or more IR seeking threats; jam power data for one or more IR seeking threats and/or timeline data for one or more IR seeking threats. In another example, the output data may comprise at least one optical break lock code segment generated by the computer 601. In another example, the output data may comprise a jamming code generated by the computer 601 (wherein the jamming code of this example is a combination code segments).

Referring now to FIG. 7, a block diagram of a system according to another embodiment of the present invention is shown. The system of this figure is similar to the system of FIG. 6. The difference here is that in this figure, computer system 701 provides output data to countermeasure system 703. In one example, output data may be provided from computer system 601 to countermeasure system 703 by a hardwired communication channel and/or a wireless communication channel. In another example, output data may be provided from computer system 601 to countermeasure system 703 via portable magnetic memory storage, portable optical memory storage and/or portable solid state memory storage.

Referring now to FIG. 8, a block diagram of a telescope spin frequency weighting value and optical break lock code according to one embodiment of the present invention is shown. As seen in this figure, this example optical break lock code 803 is generated based upon a single telescope spin frequency weighting value 801.

Referring now to FIG. 9, a block diagram of a plurality of telescope spin frequency weighting values and optical break lock code according to another embodiment of the present invention is shown. As seen in this figure, this example optical break lock code 903 is generated based upon a plurality of telescope spin frequency weighting values 901.

Referring now to FIG. 10, a block diagram of a plurality of telescope spin frequency weighting values and optical break lock code (having a plurality of optical break lock code segments) according to another embodiment of the present invention is shown. As seen in this figure, this example optical break lock code 1003 (including optical break lock code segments 1003A, 1003B and 1003C) is generated based upon a plurality of telescope spin frequency weighting values 1001. In one specific example, each of optical break lock code segments 1003A, 1003B and 1003C may differ from each other depending upon the plurality of telescope spin frequency weighting values 1001.

As described herein, the spin frequency weighting value(s) may be used to set, for one or more optical break lock codes or segments: (a) one or more frequencies; (b) one or more power levels for any given frequencies; (c) one or more start times for any given frequencies; (d) one or more end times for any given frequencies; and/or (e) one or more durations for any given frequencies.

In one specific example, a plurality of combined or concatenated jam code segments may be stored as a single jam code in a flight Electronics Control Unit ("ECU") of a countermeasure system. In this example, when threat typing is performed, the threat typing may be used to select a specific jam code segment or segments (e.g., jam code segment 1 may address missiles A, B, & C; jam code segment 2 may address missiles D, E, & F). In another example, multiple jam codes may be stored in an ECU (e.g., jam code 1 may address missiles A, B, & C; jam code 2 may address missiles D, E, & F).

In another specific example, the jam code segment(s) and/or jam code(s) may be designed and generated before the countermeasure system receiving the jam code segment(s) and/or jam code(s) is even installed on its receiving platform. In another example, the jam code segment(s) and/or jam code(s) may be designed based on the perceived/expected threat(s) that could be encountered. In another example, a countermeasure system may be installed on a potential target (e.g., an aircraft or the like).

In other examples, embodiments of the invention may be applied to military use and/or commercial use.

In other examples, a length, a duration, a power and/or a frequency of each of the code segment(s) and/or the code(s) may be varied (independently and/or in dependence upon one another) as appropriate.

In other examples, any steps described herein may be carried out in any appropriate desired order.

While the present invention has been shown and described with respect to various embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims. In addition, all of the examples disclosed herein are intended to be illustrative, and not restrictive.

What is claimed is:

1. A computer readable storage medium, tangibly embodying a program of instructions executable by the computer for generating at least one optical break lock code segment for jamming a first IR radiation seeking threat, the program of instructions, when executing, performing the following steps:
   generating a set of telescope spin frequency weighting values for the first IR seeking threat based at least in part on telescope spin frequency variation data for the first IR seeking threat and jam power data for the first IR seeking threat; and
   generating an optical break lock code segment for the first IR seeking threat based at least in part on the set of telescope spin frequency weighting values, wherein the optical break lock code segment is generated such that:
   (a) the optical break lock code segment comprises, based at least in part on the set of telescope spin frequency weighting values, a plurality of frequencies associated with the first IR seeking threat; and
   (b) a power of at least a first one of the plurality of frequencies associated with the first IR seeking threat is weighted in the optical break lock code segment, based at least in part on the set of telescope spin frequency weighting values, to be different from a power of at least a second one of the plurality of frequencies associated with the first IR seeking threat.

2. The computer readable storage medium of claim 1, wherein the generating the set of telescope spin frequency weighting values for the first IR seeking threat is further based at least in part on timeline data for the first IR seeking threat.

3. The computer readable storage medium of claim 2, wherein the program of instructions, when executing, further performs the following steps:
   receiving the telescope spin frequency variation data for the first IR seeking threat;
   receiving the jam power data for the first IR seeking threat; and
   receiving the timeline data for the first IR seeking threat.

4. The computer readable storage medium of claim 2, wherein the program of instructions, when executing, further performs the following steps:
   generating the telescope spin frequency variation data for the first IR seeking threat;
   generating the jam power data for the first IR seeking threat; and
   generating the timeline data for the first IR seeking threat.

5. The computer readable storage medium of claim 2, wherein each of the telescope spin frequency weighting values comprises a frequency weighting value, a jam power data weighting value and a time weighting value.

6. The computer readable storage medium of claim 1, wherein the generating the optical break lock code segment for the first IR seeking threat based at least in part on the set of telescope spin frequency weighting values comprises generating a plurality of optical break lock code segments for the first IR seeking threat based at least in part on the set of telescope spin frequency weighting values.

7. The computer readable storage medium of claim 1, wherein the program of instructions, when executing, further performs the following steps:
   generating a first set of telescope spin frequency weighting values for the first IR seeking threat based at least in part on first telescope spin frequency variation data for the first IR seeking threat, first jam power data for the first IR seeking threat and first timeline data for the first IR seeking threat; and
   generating a second set of telescope spin frequency weighting values for a second IR seeking threat based at least in part on second telescope spin frequency variation data for the second IR seeking threat, second jam power data for the second IR seeking threat and second timeline data for the second IR seeking threat;
   generating a first optical break lock code segment for the first IR seeking threat based at least in part on the first set of telescope spin frequency weighting values; and
   generating a second optical break lock code segment for the second IR seeking threat based at least in part on the second set of telescope spin frequency weighting values.

8. The computer readable storage medium of claim 7, wherein the program of instructions, when executing, further performs the following steps:
   receiving the first telescope spin frequency variation data for the first IR seeking threat;
   receiving the first jam power data for the first IR seeking threat;
   receiving the first timeline data for the first IR seeking threat;
   receiving the second telescope spin frequency variation data for the second IR seeking threat;
   receiving the second jam power data for the second IR seeking threat; and
   receiving the second timeline data for the second IR seeking threat.

9. The computer readable storage medium of claim 7, wherein the program of instructions, when executing, further performs the following steps:
   generating the first telescope spin frequency variation data for the first IR seeking threat;
   generating the first jam power data for the first IR seeking threat;
   generating the first timeline data for the first IR seeking threat;
   generating the second telescope spin frequency variation data for the second IR seeking threat;
   generating the second jam power data for the second IR seeking threat; and
   generating the second timeline data for the second IR seeking threat.

10. The computer readable storage medium of claim 7, wherein the first optical break lock code segment and the second optical break lock code segment are combined into a single multiple threat optical break lock code.

11. The computer readable storage medium of claim 1, wherein the telescope spin frequency variation data includes a spectral response of a filter associated with the first IR seeking threat which varies according to a band of telescope spin frequencies that are generated while the first IR seeking threat is in flight.

12. The computer readable storage medium of claim 1, wherein the telescope spin frequency variation data includes an effect of a flight profile of the first IR seeking threat which varies while the first IR seeking threat is in flight.

13. The computer readable storage medium of claim 1, wherein the program of instructions, when executing, further performs the following step:
   configuring a countermeasure system to use the optical break lock code segment for jamming the first IR radiation seeking threat.

14. The computer readable storage medium of claim 13, wherein the configuring the countermeasure system includes storing the optical break lock code segment in a storage unit of the countermeasure system.

15. The computer readable storage medium of claim 13, wherein the countermeasure system is installed in an aircraft.

16. A method implemented in a computer system for generating at least one optical break lock code segment for jamming a first IR radiation seeking threat, the method comprising the steps of:
generating with the computer system a set of telescope spin frequency weighting values for the first IR seeking threat based at least in part on telescope spin frequency variation data for the first IR seeking threat and jam power data for the first IR seeking threat; and
generating with the computer system an optical break lock code segment for the first IR seeking threat based at least in part on the set of telescope spin frequency weighting values, wherein the optical break lock code segment is generated such that:
(a) the optical break lock code segment comprises, based at least in part on the set of telescope spin frequency weighting values, a plurality of frequencies associated with the first IR seeking threat; and
(b) a power of at least a first one of the plurality of frequencies associated with the first IR seeking threat is weighted in the optical break lock code segment, based at least in part on the set of telescope spin frequency weighting values, to be different from a power of at least a second one of the plurality of frequencies associated with the first IR seeking threat.

17. The method of claim 16, wherein the generating with the computer system the set of telescope spin frequency weighting values for the first IR seeking threat is further based at least in part on timeline data for the first IR seeking threat.

18. The method of claim 17, further comprising:
receiving with the computer system the telescope spin frequency variation data for the first IR seeking threat;
receiving with the computer system the jam power data for the first IR seeking threat; and
receiving with the computer system the timeline data for the first IR seeking threat.

19. The method of claim 17, further comprising:
generating with the computer system the telescope spin frequency variation data for the first IR seeking threat;
generating with the computer system the jam power data for the first IR seeking threat; and
generating with the computer system the timeline data for the first IR seeking threat.

20. The method of claim 17, wherein each of the telescope spin frequency weighting values comprises a frequency weighting value, a jam power data weighting value and a time weighting value.

21. The method of claim 16, wherein the generating with the computer system the optical break lock code segment for the first IR seeking threat based at least in part on the set of telescope spin frequency weighting values comprises generating with the computer system a plurality of optical break lock code segments for the first IR seeking threat based at least in part on the set of telescope spin frequency weighting values.

22. The method of claim 16, further comprising:
generating with the computer system a first set of telescope spin frequency weighting values for the first IR seeking threat based at least in part on first telescope spin frequency variation data for the first IR seeking threat, first jam power data for the first IR seeking threat and first timeline data for the first IR seeking threat; and
generating with the computer system a second set of telescope spin frequency weighting values for a second IR seeking threat based at least in part on second telescope spin frequency variation data for the second IR seeking threat, second jam power data for the second IR seeking threat and second timeline data for the second IR seeking threat;
generating with the computer system a first optical break lock code segment for the first IR seeking threat based at least in part on the first set of telescope spin frequency weighting values; and
generating with the computer system a second optical break lock code segment for the second IR seeking threat based at least in part on the second set of telescope spin frequency weighting values.

23. The method of claim 22, further comprising:
receiving with the computer system the first telescope spin frequency variation data for the first IR seeking threat;
receiving with the computer system the first jam power data for the first IR seeking threat;
receiving with the computer system the first timeline data for the first IR seeking threat;
receiving with the computer system the second telescope spin frequency variation data for the second IR seeking threat;
receiving with the computer system the second jam power data for the second IR seeking threat; and
receiving with the computer system the second timeline data for the second IR seeking threat.

24. The method of claim 22, further comprising:
generating with the computer system the first telescope spin frequency variation data for the first IR seeking threat;
generating with the computer system the first jam power data for the first IR seeking threat;
generating with the computer system the first timeline data for the first IR seeking threat;
generating with the computer system the second telescope spin frequency variation data for the second IR seeking threat;
generating with the computer system the second jam power data for the second IR seeking threat; and
generating with the computer system the second timeline data for the second IR seeking threat.

25. The method of claim 22, wherein the first optical break lock code segment and the second optical break lock code segment are combined into a single multiple threat optical break lock code.

26. The method of claim 16, wherein the telescope spin frequency variation data includes a spectral response of a filter associated with the first IR seeking threat which varies according to a band of telescope spin frequencies that are generated while the first IR seeking threat is in flight.

27. The method of claim 16, wherein the telescope spin frequency variation data includes an effect of a flight profile of the first IR seeking threat which varies while the first IR seeking threat is in flight.

28. The method of claim 16, further comprising configuring, with the computer system, a countermeasure system to use the optical break lock code segment for jamming the first IR radiation seeking threat.

29. The method of claim 28, wherein the configuring the countermeasure system includes storing the optical break lock code segment in a storage unit of the countermeasure system.

30. The method of claim 28, wherein the countermeasure system is installed in an aircraft.

31. The method of claim 18, wherein each of the received telescope spin frequency variation data; the received jam power data and the received timeline data is stored in a database accessible by the computer system.

32. The method of claim 23, wherein each of the received first telescope spin frequency variation data; the received first jam power data, the received first timeline data, the received second telescope spin frequency variation data; the received second jam power data and the received second timeline data is stored in a database accessible by the computer system.

33. A method implemented in a computer system for generating at least one optical break lock code segment for jamming an IR radiation seeking threat, the method comprising the steps of:
receiving with the computer system telescope spin frequency variation data for the IR seeking threat;
receiving with the computer system jam power data for the IR seeking threat;
generating with the computer system a set of telescope spin frequency weighting values for the IR seeking threat based at least in part on the received telescope spin frequency variation data for the IR seeking threat and the received jam power data for the IR seeking threat;
generating with the computer system an optical break lock code segment for the IR seeking threat based at least in part on the set of telescope spin frequency weighting values; and
configuring, with the computer system, a countermeasure system to use the optical break lock code segment for jamming the IR radiation seeking threat;
wherein the optical break lock code segment is generated such that:
(a) the optical break lock code segment comprises, based at least in part on the set of telescope spin frequency weighting values, a plurality of frequencies associated with the IR seeking threat; and
(b) a power of at least a first one of the plurality of frequencies associated with the IR seeking threat is weighted in the optical break lock code segment, based at least in part on the set of telescope spin frequency weighting values, to be different from a power of at least a second one of the plurality of frequencies associated with the IR seeking threat.

34. The method of claim 33, wherein the generating with the computer system the set of telescope spin frequency weighting values for the IR seeking threat is further based at least in part on timeline data for the IR seeking threat.

35. A method implemented in a computer system for generating at least one optical break lock code segment for jamming an IR radiation seeking threat, the method comprising the steps of:
generating with the computer system telescope spin frequency variation data for the IR seeking threat;
generating with the computer system jam power data for the IR seeking threat;
generating with the computer system a set of telescope spin frequency weighting values for the IR seeking threat based at least in part on the received telescope spin frequency variation data for the IR seeking threat and the received jam power data for the IR seeking threat;
generating with the computer system an optical break lock code segment for the IR seeking threat based at least in part on the set of telescope spin frequency weighting values; and
configuring, with the computer system, a countermeasure system to use the optical break lock code segment for jamming the IR radiation seeking threat;
wherein the optical break lock code segment is generated such that:
(a) the optical break lock code segment comprises, based at least in part on the set of telescope spin frequency weighting values, a plurality of frequencies associated with the IR seeking threat; and
(b) a power of at least a first one of the plurality of frequencies associated with the IR seeking threat is weighted in the optical break lock code segment, based at least in part on the set of telescope spin frequency weighting values, to be different from a power of at least a second one of the plurality of frequencies associated with the IR seeking threat.

36. The method of claim 35, wherein the generating with the computer system the set of telescope spin frequency weighting values for the IR seeking threat is further based at least in part on timeline data for the IR seeking threat.

* * * * *